United States Patent Office 2,999,877
Patented Sept. 12, 1961

2,999,877
SYNTHESIS OF 1,4-DICAFFEYL-QUINIC ACID
Alberto Vercellone, Milan, and Luigi Panizzi, Rome, Italy, assignors to Società Farmaceutici Italia, Milan, Italy, a corporation of Italy
No Drawing. Filed Dec. 27, 1955, Ser. No. 555,283
Claims priority, application Italy Dec. 28, 1954
6 Claims. (Cl. 260—473)

This invention relates to improvements in the synthesis of 1,4-dicaffeyl-quinic acid, which lately has gained importance because of its pronounced physiological effects.

In the copending application, Serial No. 510,866, filed May 24, 1955, of which this application is a continuation-in-part, a method of synthesizing 1,4-dicaffeyl-quinic acid has been described which consists, substantially, in condensing a caffeic acid derivative of the type

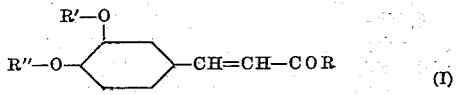
(I)

wherein R represents chlorine and

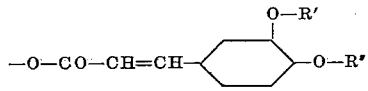

and R', R" individually represent carbomethoxy, carboethoxy and carbobenzoxy, and jointly represent carbonyl, with a compound of the group consisting of quinide and the 4,5-alkylidene derivatives of quinide corresponding to the formula

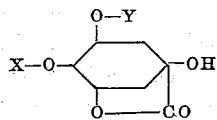

wherein X, Y individually represent hydrogen and jointly represent alkylidene (isopropylidene), to obtain intermediates of the general formula

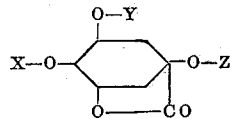

wherein X, Y, Z individually represent the radical

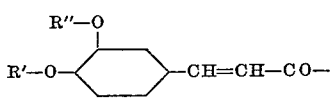

Z represents said radical while X and Y jointly represent alkylidene (isopropylidene) and X, Z individually represent said radical while Y represents hydrogen, and subjecting these intermediates to a selective saponification to obtain compounds of the general formula

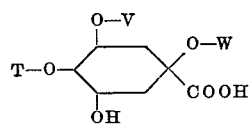

in which the carboxyl can be esterified with the hydroxyl in γ-position to form the quinide lactone ring and wherein at least one of T, V, W represents hydrogen and at least one other represents

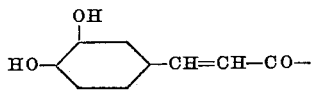

We have now found that, in order to synthesize 1,4-dicaffeyl-quinic acid, instead of a caffeic acid derivative of Formula I, the chloride of thionyl-caffeic acid

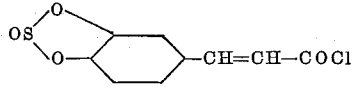

may be used and, in lieu of quinide (lactone of quinic acid), quinic acid

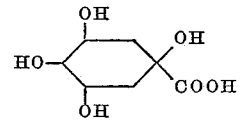

itself. The 1,4-dicaffeyl-quinic acid is then obtained by selectively saponifying the reaction product in treating it with a 3% barium hydroxide solution, followed by acidification.

Obviously, the same result is obtained upon condensing the chloride of thionyl-caffeic acid with quinide, or upon condensing chlorides of carboalkyloxy or carboaryloxy acids of a caffeic acid derivative defined by the general Formula I with quinic acid, as described in the afore-mentioned co-pending patent application. However a special advantage of the present invention is that use of the quinide is not necessary. Since the quinide is generally derived from quinic acid, the direct reaction of the latter provides a more economical process.

Condensation is accomplished by mixing 1 to 4 mols of an acyl derivative according to the general Formula I with 4 to 1 mols of quinic acid or quinide and heating the mixture for fifteen to ninety minutes to a temperature from 110 to 180° C. and then selectively saponifying by treating the condensation product with 3% barium hydroxide solution at 0 to 30° C. for a period of one to forty hours while excluding the access of air. The chloride of thionyl-caffeic acid is obtaned by refluxing caffeic acid with an excess of thionyl chloride until dissolution occurs, and evaporation of thionyl chloride until crystallization takes place. The chloride of thionyl-caffeic acid can then be recrystallized from an inert solvent (hydrocarbon, chlorinated hydrocarbon).

The following examples are presented to illustrate the invention but in no way to restrict the scope thereof.

*Example 1*

10.0 g. of carbonyl-caffeic acid chloride are mixed with 2.86 g. of quinic acid and heated slowly under vacuum to a temperature of 160° C. which is then maintained for twenty to thirty minutes. After cooling, the molten mass is taken up with acetone and poured into 1 liter of 3% barium hydroxide solution while working in a nitrogen atmosphere to avoid access of air. After forty hours, the yellow precipitate is filtered off and suspended in 150 cc. of 2 N HCl. The suspension is filtered, the cake treated with a 10% sodium bicarbonate solution, filtered, washed with 2 N HCl and water, and finally dissolved in hot 55% acetic acid. 1,4-dicaffeyl-quinic acid crystallizes, having a M.P. of 225–227° C., $(\alpha)_D^{22°} = -66° \pm 1°$ (c.=2.0: ethanol).

*Example 2*

10.0 g. of thionyl-caffeic acid chloride are condensed with 3.56 g. of quinide in the manner indicated in Example 1. A molten mass is obtained, which is dissolved in dioxane and poured into 1 liter of 3% barium hydroxide solution, while operating in a nitrogen atmosphere. Proceeding according to Example 1, 1,4-dicaffeyl-quinic acid, having a M.P. of 224–227° C. (decomposition), is obtained.

The chloride of thionyl-caffeic acid is prepared by boiling 30 g. of caffeic acid with 90 cc. of thionyl chloride;

after seven to eight hours a brown solution is obtained, which is evaporated to dryness under vacuum. By recrystallizing the residue from trichloroethylene, thionyl-caffeic acid chloride, having a M.P. of 88 to 94° C., is obtained.

*Example 3*

10.0 g. of thionyl-caffeic acid chloride and 3.93 g. of quinic acid are heated under vacuum within a period of 1.5 hours to 155° C. A molten mass is obtained, which is dissolved in dioxane and poured into 1000 cc. of 3% barium hydroxide solution, while operating under an inert gas. After forty hours' standing, the yellow precipitate is filtered off and treated first with dilute HCl, then with sodium bicarbonate and again with more diluted HCl. The crude 1,4-dicaffeyl-quinic acid thus obtained is purified in the usual manner from aqueous acetic acid.

We claim:

1. The process of synthesizing 1,4-dicaffeyl-quinic acid, which comprises condensing a caffeic acid derivative of the type

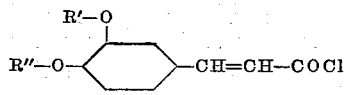

wherein R', R" individually represent members of the group consisting of carbomethoxy, carboethoxy and carbobenzoxy, and jointly represent members of the group consisting of carbonyl and thionyl, with quinic acid and saponifying the condensation product with a 3% barium hydroxide solution at 0 to 30° C. in the absence of air.

2. The process according to claim 1, wherein the chloride of thionyl-caffeic acid is condensed with quinic acid.

3. The process of synthesizing 1,4-dicaffeyl-quinic acid, which comprises condensing 1 to 4 mols of a caffeic acid derivative of the type

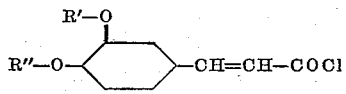

wherein R', R" individually represent members of the group consisting of carbomethoxy, carboethoxy and carbobenzoxy, and jointly represent members of the group consisting of carbonyl and thionyl, with 4 to 1 mols of quinic acid by heating for fifteen to ninety minutes to 110–180° C. and saponifying the condensation product with a 3% barium hydroxide solution for one to forty hours at 0 to 30° C. in the absence of air.

4. The process of synthesizing 1,4-dicaffeyl-quinic acid, which comprises condensing 1 to 4 mols of the chloride of thionyl-caffeic acid with 4 to 1 mols of quinic acid by heating for fifteen to ninety minutes to 110–180° C. and saponifying the condensation product with a 3% barium hydroxide solution for one to forty hours at 0 to 30° C. in the absence of air.

5. The process of synthesizing 1,4-dicaffeyl-quinic acid, which comprises condensing 1 to 4 mols of caffeic acid derivative of the type

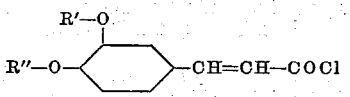

wherein R', R" individually represent members of the group consisting of carbomethoxy, carboethoxy and carbobenzoxy, and jointly represent members of the group consisting of carbonyl and thionyl, with 4 to 1 mols of quinic acid by heating for fifteen to ninety minutes at about 110–180° C. and saponifying the condensation product with aqueous barium hydroxide.

6. The process of synthesizing 1,4-dicaffeyl-quinic acid, comprising boiling caffeic acid with thionyl chloride to yield thionyl-caffeic acid chloride and condensing the latter with quinic acid by heating the two together, and saponifying the condensation product with aqueous barium hydroxide.

References Cited in the file of this patent

UNITED STATES PATENTS

| 2,587,641 | Moersch | Mar. 4, 1952 |
| 2,686,788 | Moore | Aug. 17, 1954 |

FOREIGN PATENTS

| 204,886 | Australia | Dec. 4, 1956 |

OTHER REFERENCES

Fischer et al.: Berichte, vol. 46, pp. 4035–6 (1913).
Josephson: Berichte, vol. 61, pp. 911–17 (1928).
Beilstein: Handbuch der Org. Chem., vol. XIX, 1st Supp., p. 757 (1934).
Beilstein: Handbuch der Org. Chem., vol. X, 2nd Supp., p. 296 (1949).
Luigi Panizzi and Maria Luisa Scarpati: Gazzetta Chimica Italiana, vol. 84, pp. 798–805, August 1954.
Luigi Panizzi, Maria Luisa Scarpati and Rachel Scarpati, Gazetta Chimica Italiana, vol. 84, pp. 806–815, August 1954.